United States Patent
Kim et al.

(10) Patent No.: US 8,035,913 B2
(45) Date of Patent: Oct. 11, 2011

(54) PARKING RAMP FOR HARD DISK DRIVE

(75) Inventors: Ha-yong Kim, Seoul (KR); Sung-kwon Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1328 days.

(21) Appl. No.: 11/640,305

(22) Filed: Dec. 18, 2006

(65) Prior Publication Data
US 2007/0139810 A1 Jun. 21, 2007

(30) Foreign Application Priority Data

Dec. 16, 2005 (KR) ........................ 10-2005-0124374

(51) Int. Cl.
*G11B 5/54* (2006.01)
*G11B 21/24* (2006.01)
(52) U.S. Cl. ...................................... 360/75; 360/254.5
(58) Field of Classification Search ................ 360/254.5
See application file for complete search history.

(56) References Cited

U.S. PATENT DOCUMENTS

| | | | | |
|---|---|---|---|---|
| 5,023,737 A * | 6/1991 | Yaeger | ......................... | 360/254.5 |
| 5,057,954 A * | 10/1991 | O'Sullivan et al. | ........ | 360/254.3 |
| 5,347,414 A * | 9/1994 | Kano | .......................... | 360/254.4 |
| 5,926,347 A * | 7/1999 | Kouhei et al. | ............... | 360/254.3 |
| 5,991,114 A * | 11/1999 | Huang et al. | ..................... | 360/75 |
| 6,134,076 A * | 10/2000 | Boutaghou et al. | ......... | 360/254.5 |
| 6,628,476 B2 * | 9/2003 | Mayne | ......................... | 360/254.1 |
| 6,862,154 B1 * | 3/2005 | Subrahmanyam et al. | ..... | 360/75 |
| 6,941,642 B1 * | 9/2005 | Subrahmanyam et al. | | 360/254.5 |
| 6,958,891 B2 * | 10/2005 | Bae et al. | .................... | 360/254.3 |
| 7,848,057 B1 * | 12/2010 | Shukla | ........................ | 360/254.3 |

FOREIGN PATENT DOCUMENTS

| | | |
|---|---|---|
| JP | 2003-338148 | 11/2003 |
| KR | 100505590 | 7/2005 |
| KR | 1020050073743 | 7/2005 |

* cited by examiner

*Primary Examiner* — Hoa T Nguyen
*Assistant Examiner* — James L Habermehl
(74) *Attorney, Agent, or Firm* — Volentine & Whitt, PLLC

(57) ABSTRACT

An HDD parking ramp is disclosed and includes a guide portion having an inclined surface adapted to receive a lift tab associated with an actuator mounting a read/write head during an unloading/parking operation, and a parking surface adapted to accommodate the lift tab at the completion of the unloading/parking operation, an installation support portion fixed in the HDD and adapted to support the guide portion, and a vertically adjustable driving device provided between the guide portion and the installation support portion and adapted to position the guide portion at a first vertical height relative to the installation support and a second vertical height greater than the first vertical height.

15 Claims, 7 Drawing Sheets

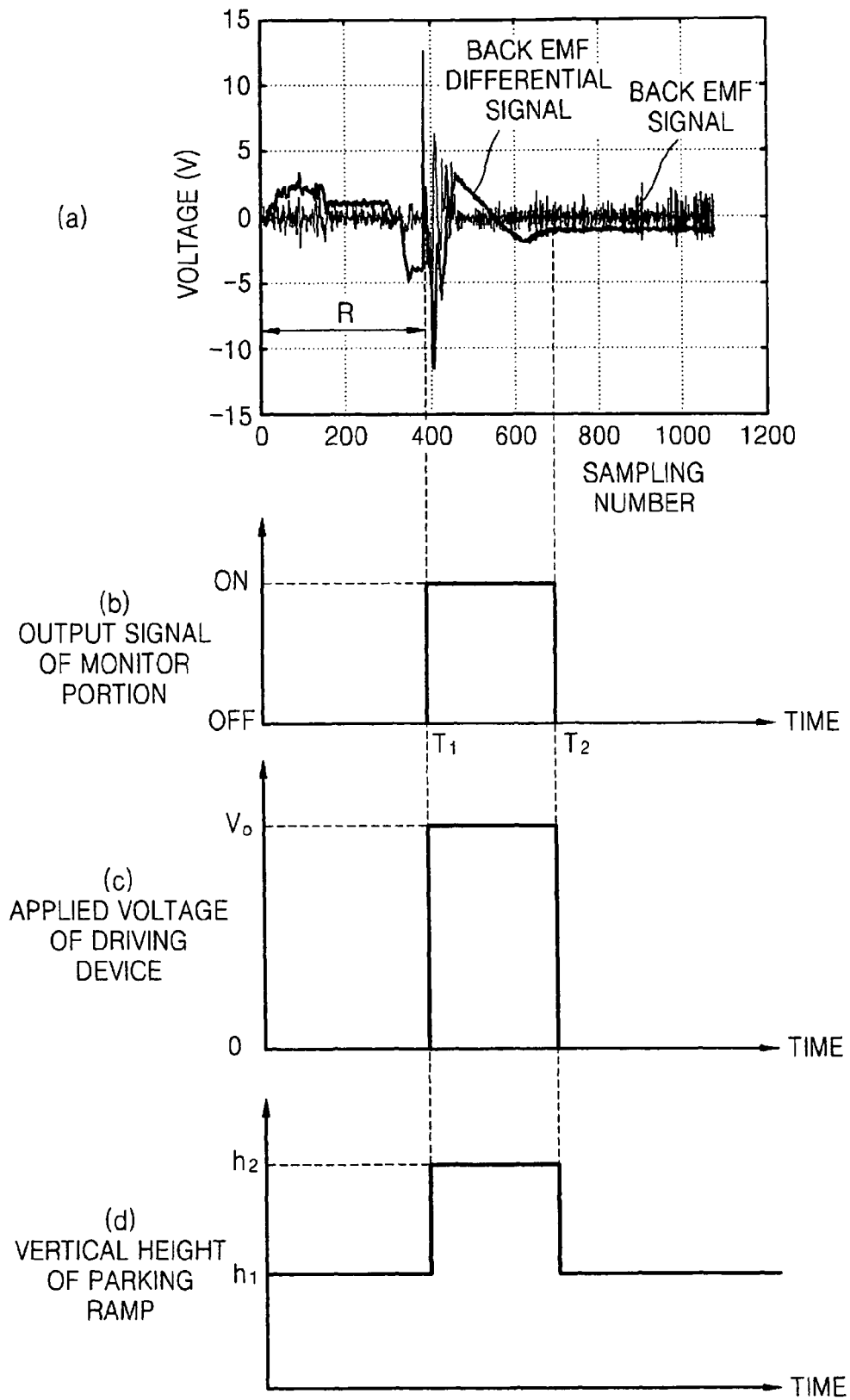

PARKING RAMP FOR HARD DISK DRIVE

BACKGROUND OF THE INVENTION

1. Field of the Invention

The present invention relates to a parking ramp for a Hard Disk Drive (HDD). More particularly, the invention relates to a parking ramp providing sufficient driving margin during an unloading operation to minimize the area allocated on a disk for the parking ramp.

This application claims the benefit of Korean Patent Application No. 10-2005-0124374, filed on Dec. 16, 2005, the subject matter of which is hereby incorporated by reference.

2. Description of the Related Art

Hard disk drives (HDDs) are commonly used within various host devices, such as personal computers (PCs), as data storage devices. In general operation, HDDs allow data to be written to and read from recording medium (e.g., a disk having a surface subject to variation in its magnetic properties) using a magnetic read/write head. Data is stored on conventional disks in terms of bits per inch (BPI)—a recording density defined in relation to the disk's rotational direction, and tracks per inch (TPI)—a recording density defined in relation to the disk's radial direction. Significant research and development efforts are currently being expended to increase data recording density according to both of these definitions. Additionally, commercial demands are motivating the design and manufacture of increasingly small HDDs. The miniaturization of HDDs, together with demands for higher data recording densities, require ever finer and more precise mechanisms within HDD structures. These demands also necessitate the efficient use of available disk space.

The read/write head within the HDD is typically moved over the recording surface of the disk using an actuator. As the HDD operates, the disk rotates at a constant speed and the read/write head floats at a predetermined height over the surface of the rotating disk. In this state, the read/write head is moved to a desired position during a read/write operation by the actuator. However, when power to the HDD is interrupted (e.g., turned OFF), the read/write head must be withdrawn from over the recording surface of the disk before it can be placed in a resting state. This type of operation is commonly referred to as an unloading/parking operation, as the read/write head is unloaded from the recording surface of the disk and safely parked in a designated location. Parking of the read/write head is usually accomplished in relation to a so-called parking ramp—a structure and/or location adapted to receive a parked read/write head.

The apparently simple task of parking a read/write head is actually fairly involved. As the disk rotates, a predetermined volume of air flow over the surface of the disk induces a pressure difference which tends to move the read/write head towards the disk surface. This downward pressure is balanced by a mechanical spring force (loading) imparted by a suspension supporting the head. When power is no longer applied to the HDD and the disk stops rotating, the combined forces that cooperate to precisely float and position the read/write head over the recording surface of the disk must be altered to rapidly move the read/write head into a parked position.

The parking ramp structure has long been used to help facilitate the unloading/parking operation. Parking ramps have a ramped (or inclined) profile adapted to receive a read/write head. The shape and size of the parking ramp must be carefully designed in relation an available driving margin applied to the actuator during an unloading/parking operation. That is, as the inclination of a parking ramp's inclined surface decreases, the driving margin for the unloading/parking operation is generally improved. Providing a larger voice coil motor to drive the actuator during an unloading/parking operation is another way of increasing driving margin.

However, as ever more compact HDDs are developed for mobile use, ones ability to provide larger voice coil motors and longer, less steeply inclined parking ramps become very restricted. There simple isn't enough room within the HDD. This restriction presents a real problem as relatively steep inclinations for the parking ramp and limited driving margin may result is situations where the read/write head can not be moved completely off the recording surface of the disk. This is particularly true since smaller HDDs have smaller disks. As a result, disks must often be provided with relatively large safe zones adapted to receive contact from a "parked" read/write head. This safe zone area may not be used to record data and the storage capacity of the HDD is restricted.

SUMMARY OF THE INVENTION

Embodiments of the invention provide a parking ramp and associated circuitry that ensure sufficient driving margin to completely unload a read/write head from the recording surface of a disk. As such, the safe zone area allocated on the disk may be significantly reduced.

In one embodiment, the invention provides a parking ramp for a hard disk drive (HDD), comprising; a guide portion having an inclined surface adapted to receive a lift tab associated with an actuator mounting a read/write head during an unloading/parking operation, and a parking surface adapted to accommodation the lift tab at the completion of the unloading/parking operation, a installation support portion fixed in the HDD and adapted to support the guide portion, and a vertically adjustable driving device provided between the guide portion and the installation support portion and adapted to position the guide portion at a first vertical height relative to the installation support and a second vertical height greater than the first vertical height.

In another embodiment, the invention provides a hard disk drive (HDD), comprising; a disk having upper and lower recording surfaces, at least one actuator supporting first and second read/write heads adapted to move respectively over the upper and lower recording surfaces and comprising first and second lift tabs, and a parking ramp. The parking ramp comprises; first and second guide portions, each having an inclined surface adapted to receive respectively the first and second lift tabs during an unloading/parking operation, an installation support portion fixed in the HDD and adapted to support the first and second guide portions, a vertically adjustable first driving device provided between the first guide portion and the installation support portion and adapted to position the first guide portion at a first vertical height relative to the installation support and a second vertical height greater than the first vertical height, and a vertically adjustable second driving device provided between the second guide portion and the installation support portion and adapted to position the second guide portion at a third vertical height relative to the installation support and a fourth vertical height greater than the third vertical height.

In one related aspect of the invention the driving device may vertically expand from an original state when an operating voltage is applied and vertically contract back to the original state when the operating voltage is no longer applied.

In another related aspect of the invention, the driving device may be made of a shape memory alloy (SMA) actuating material or a PZT actuating material.

BRIEF DESCRIPTION OF THE DRAWINGS

FIG. 6 is a timing diagram showing an internal signal of the hard disk drive of FIG. 5 according to the passage of time;

DESCRIPTION OF EMBODIMENTS

Figure 1:
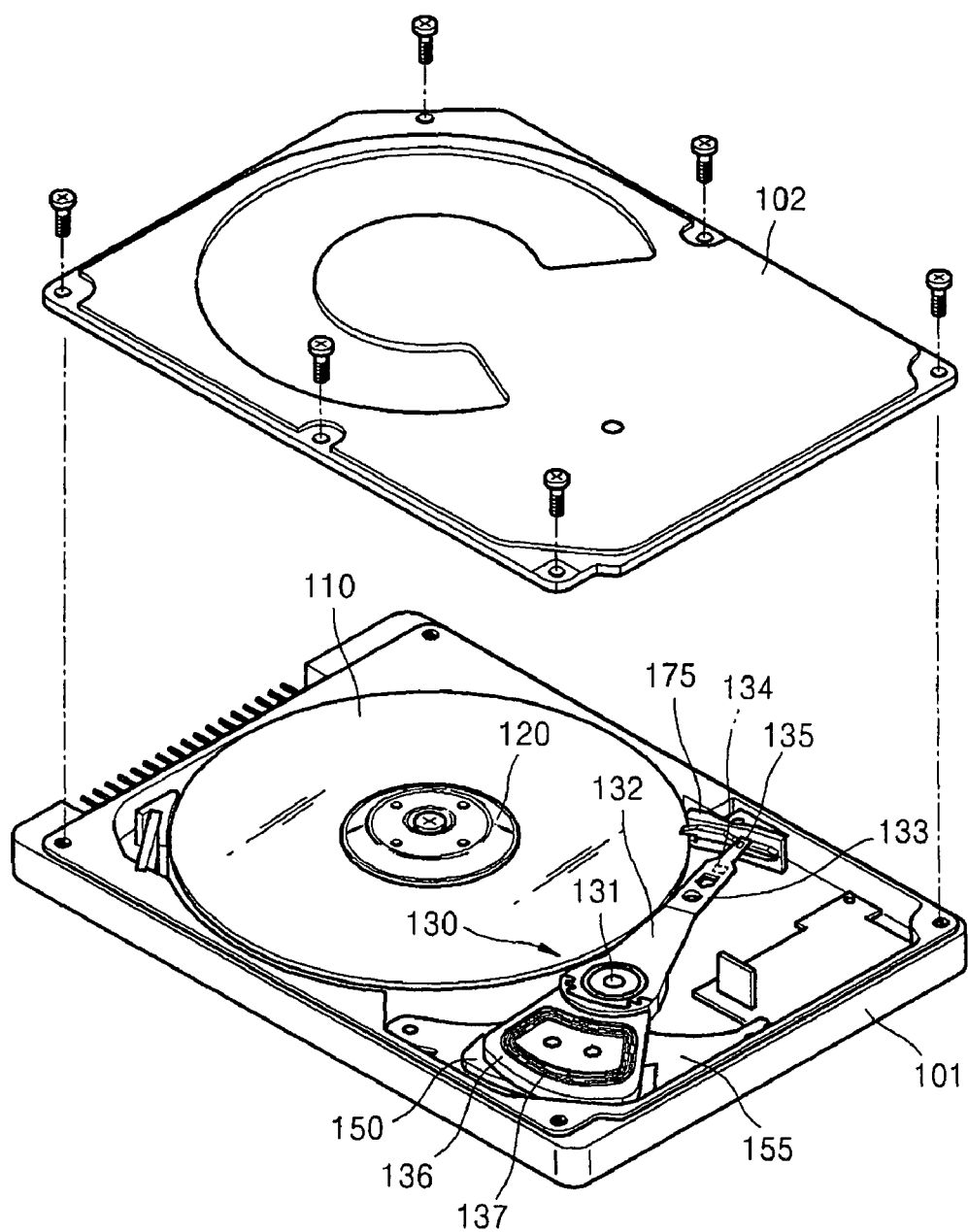
FIG. 1 is an exploded perspective view of a hard disk drive susceptible to the advantages of the present invention.

FIG. 1 is an exploded perspective view of a HDD. Referring to FIG. 1, the HDD includes a spindle motor 120 rotating a disk 110, and an actuator 130 pivoting over and outside disk 110. A read/write head 134 is mounted on actuator 130 and may be positioned over disk 110 by operation of actuator 130.

Spindle motor 120 is installed on a base member 101 of the HDD. Disk 110 may be one or a plurality of disks adapted to store data and is rotated by the spindle motor 120 at a constant angular velocity. Actuator 130 includes an actuator pivot 131 installed on base member 101, a swing arm 132, a suspension 133, a coil support portion 136, and a voice coil motor (VCM). Swing arm 132 is rotatably coupled to actuator pivot 131. Suspension 133 mounts and supports read/write head 134 at one end of swing arm 132. A lift tab 135 is provided at the other end of suspension 133. As lift tab 135 is accommodated on a parking ramp 175, read/write head 134 when positioned on parking ramp 175 is safely positioned off the recording surface of disk 110.

The VCM provides a driving force to rotate swing arm 132. Swing arm 132 is rotated in a direction according to Fleming's left hand rule under the influence of electrical current applied to a VCM coil 137 and a magnetic field formed by a magnet 150. VCM coil 137 is assembled on coil support portion 136 that is coupled to a rear end portion of swing arm 132. Magnet 150 is arranged facing VCM 137 in portions above and under VCM coil 137, and supported by yoke 155.

Although not shown, a flexible printed cable is commonly connected at one side of actuator 130. Through this cable, command and control signals may be communicated to read/write head 134 and its associated circuitry and mechanical assemblies.

Spindle motor 120 and actuator 130 are accommodated in an inner space between base member 101 and a cover member 102. Base member 101 and cover member 102 prevent the intrusion of foreign matter and mechanically and electrically protect the various components of the HDD.

When power is applied to the HDD, disk 110 is rotated by spindle motor 120, the VCM rotates swing arm 132 in a predetermined direction, for example, counterclockwise, to load read/write head 134 over disk 110. Read/write head 134 is lifted to float over the surface of disk 110 by a force generated by the rotation of disk 110, and is maintained at a predetermined flying height above the surface of disk 110. In this state, read/write head 134 may be moved to follows a particular track on disk 110 to write (i.e., record) data onto disk 110 or read (i.e., reproduce) data from disk 110.

When power applied to the HDD is interrupted, the rotation of disk 110 stops. VCM rotates swing arm 132 in the opposite direction, for example, clockwise, to unload read/write head 134 from disk 110. Read/write head 134 is then parked on parking ramp 175 located outside the circumference of disk 110.

Figure 2:
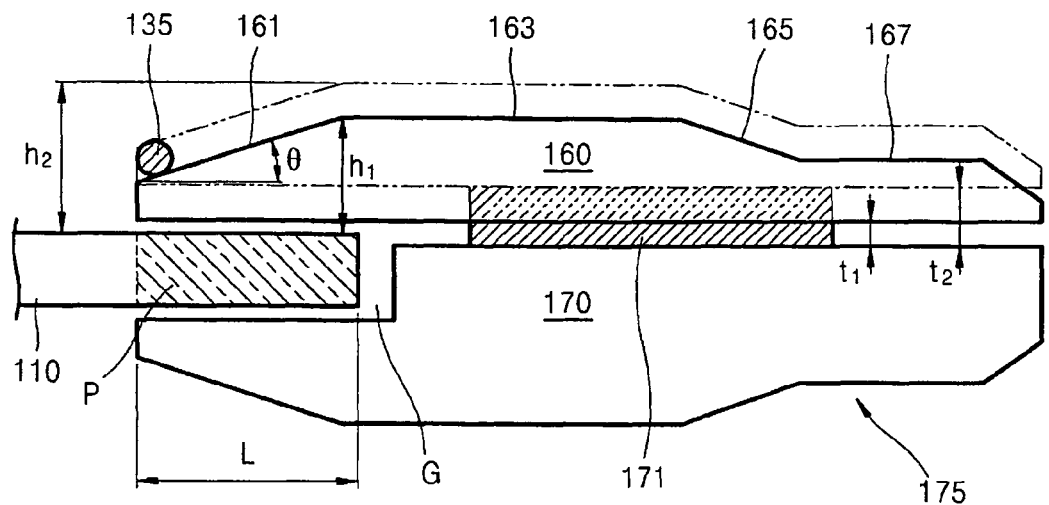
FIG. 2 is a vertical sectional view of the parking ramp of FIG. 1.

FIG. 2 is a vertical sectional view of parking ramp 175 shown in FIG. 1. Referring to FIG. 2, when an unloading/parking operation is initiated, read/write head 134 maintains its predetermined flying height above the surface of disk 110 until it is unloaded from disk 110 and approaches parking ramp 175. In order to facilitate the unlading/parking operation with a reduced risk of dropping read/write head 134 onto disk 110, parking ramp 175 is provide to overlap disk 110 by a small overlap distance "L". This may be accomplished by providing an opening G adapted to receive an outer circumferential portion of disk 110.

In the illustrated example, parking ramp 175 includes an upper guide portion 160 and an opposing installation support portion 170. Parking ramp 175 further includes a driving device 171 located between guide portion 160 and installation support portion 170. Driving device 171 may be used to adjust the vertical separation between guide portion 160 and disk 110 (e.g., the relationship between measures h1 and h2 in the illustrated example). For example, driving device 171 may be adjusted to expands or contract, thereby defining the vertical separation.

Guide portion 160 includes a plurality of support surfaces 161, 163, 165, and 167 adapted to guide lift tab 135. That is, as lift tab 135 is moved from the surface of disk 110 onto parking ramp 175, support surfaces 161, 163, 165, and 167 are used to position lift tab 175 (and therefore read/write head 134 ) in a parked position. For example, guide portion 160 includes an inclined surface 161 adapted to vertically separate lift tab 135 from the surface of disk 110, a horizontal guide surface 163 adapted to horizontally move lift tab 135 while maintaining the defined vertical separation, a capture surface 165 having an inclination opposite to that of inclined surface 161 and adapted to prevent lift tab 135 from accidentally bouncing off parking ramp 175 back onto disk 110 under the impact of an external shock, and a parking surface 167 adapted to receive lift tab 135 once an unloading/parking operation is completed.

Installation support portion 170 is fixed to the lower surface of base member 101, for example, using a screw, for example. Guide portion 160 is not directly fixed to base member 101, but is supported through its attachment to installation support portion 170, while remaining freely adjustable in its vertical separation from installation support portion 170.

Driving device 171 may be formed from a self actuating material such as shape memory alloy (SMA) or PZT capable of providing vertical expansion or contraction in relation to their internal crystalline structure in response to externally applied voltage. In this manner, driving device 171 vertically displaces inclined surface 161 of parking ramp 175 as it expands and contracts in response to an applied voltage. That is, as shown in FIG. 2, as driving device 171 expands from thickness "t1" to thickness "t2", the vertical separation between inclined surface 161 and disk 110 changes from "h1" to "h2". This vertical separation (or displacement) (h2-h1) may be finely adjusted down to a range of tens of micrometers. Although not shown in FIG. 2, a PZT driving device 171 may comprise a multilayer structure formed from a plurality of overlaying piezoelectric layers sandwiched between first and second electrodes and adapted to receive an applied drive voltage.

Driving device 171 may be operated in a relatively simple ON/OFF driving method. For example, in an ON state, a predetermined drive voltage is applied to driving device 171 from an external power supply to induce expansion of driving device 171. In an OFF state, the drive voltage applied to driving device 171 is cut off so as to induce contraction of the material back to its original state.

For example, the magnitude of a drive voltage applied to a PZT driving device 171 will be appropriately selected in relation to the PZT material being used and a desired vertical displacement. Vertical displacement may be provided in a unidirectional or bidirectional manner. For example, the displacement direction in PZT driving device 171 is dependent on the polarization direction of the piezoelectric materials being used. The piezoelectric material may be arranged such that the polarization direction is aligned parallel to the vertical direction. The external power supply may be a constant voltage source supplying a constant voltage with a switching device interposed between the constant power source and driving device 171 to electrically connect/disconnect the constant power source from driving device 171.

Vertical displacement according to the expansion/contraction of driving device 171 directly defines the separation of guide portion 160 from disk 110. As driving device 171 switches ON and OFF, vertical displacement may be finely adjusted. As a result, inclined surface 161 of parking ramp 175 may be precisely positioned in relation to disk 110.

Figure 3:
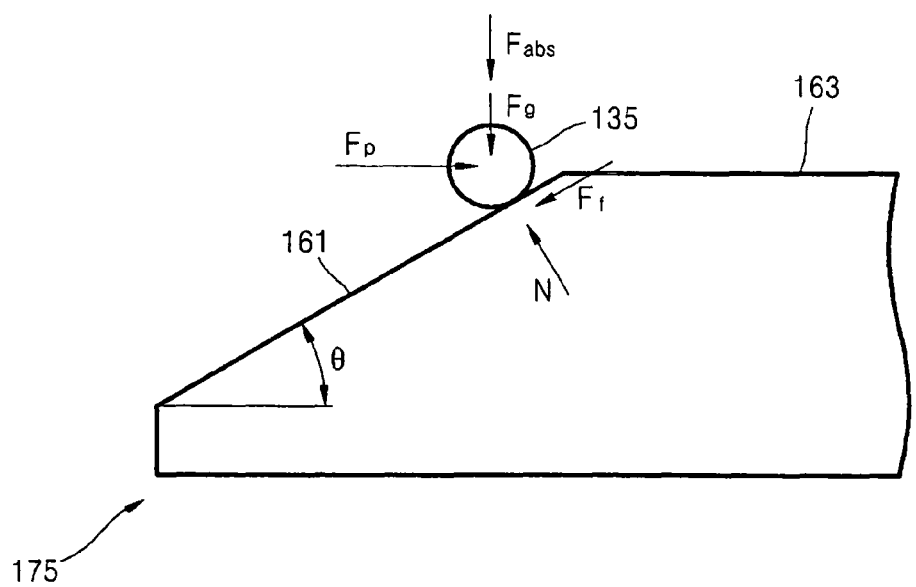
FIG. 3 is a sectional view showing the operation of forces applied to the lift tab located at a parking ramp of FIG. 2.

FIG. 3 is a sectional view illustrating the forces at work on lift tab 135 as it is moved onto and up inclined surface 161 of parking ramp 175. Referring to FIG. 3, an air pressure Fabs in the downward direction is applied to lift tab 135 at the end portion of suspension 133 due to an air pressure difference between the upper and lower sides of suspension 133 as they pass over rotating disk 110. In addition to the air pressure Fabs, a load force Fg applied by suspension 133 is also biased downward towards disk 110. Additionally. a vertical drag force N in a direction perpendicular to the surface of inclined surface 161 and a frictional resistance Ff in a direction parallel to the surface of inclined surface 161 act upon lift tab 135. As the angle θ of inclined surface 161 increases, the vertical drag force N and frictional resistance Ff increase. In contrast, as the angle θ of inclined surface 161 decreases, the vertical drag force N and frictional resistance Ff decrease. In addition to the frictional resistance Ff, additional resisting factor act upon lift tab 135 as it moves up inclined surface 161, such as a pivot resistance acting on the actuator pivot and an elastic bias resistance caused by the elasticity of a flexible printed circuit itself, etc.

A drive torque force Fp is applied to lift tab 135 by the voice coil motor must effectively counter all of these resistive forces. That is, the drive torque Fp must provide sufficient force to overcome the various resisting factors including the frictional resistance Ff. The required output of the voice coil motor may be calculated in relation to a given motor constant "Kt", by the formula, ( Kt=Fp/I) where "I" equals the drive current applied to the voice coil motor.

The driving margin, defined by the ratio of the drive torque Ff with respect to the combination of resisting forces, may provide a reference for the design of the shape of parking ramp 175 and/or the design of the power of the voice coil motor. For example, Table 1 below shows calculated driving margins for parking ramp inclination angles of 15.3° and 14.3.

TABLE 1

|  | Kt (mmN/A) | | | |
| --- | --- | --- | --- | --- |
|  | Kt = 950 | | Kt = 1016.5 | |
|  | 15.3° | 14.3° | 15.3° | 14.3° |
| Driving Margin | 1.51 | 1.63 | 1.56 | 1.75 |

Table 1 shows the driving margin of the voice coil motor having a motor constant Kt of 950 mmN/A. In this example, as the inclination angle θ of the ramp decreases from 15.3° to 14.3°, the driving margin increases due to the decreased frictional resistance. However, under an assumption that a driving margin of not less than 1.7 is required to accomplish the unloading/parking operation, the decreased parking ramp angle proves insufficient for the first motor constant assumption.

Table 1 also shows a second example assuming a 7% increase in the output of the voice coil motor (e.g., a motor constant Kt of 1016.5 mmN/A). In this example, as the inclination angle θ decreases from 15.3° to 14.3°, the driving margin increases from 1.56 to 1.75. So, by decreasing the inclination angle, a sufficient driving margin for the unloading/parking operation may be obtained.

Hence, given a specific output for a constituent voice coil motor, the inclination angle θ of the parking ramp is a very significant design parameter to ensuring a sufficient driving margin. In particular, in a compact HDD design adapted for mobile use in which the output of the voice coil motor is limited due to practical limitation in the available installation space, reductions in inclination angle θ of the parking ramp are generally preferable, as they result in greater driving margin.

Embodiments of the present invention generally include parking ramps having relatively reduced inclination angles for inclination surface 161. As a result, a relatively greater driving force is applied during unloading/parking operations. These embodiments will be described in some additional detail hereafter.

However, returning for the moment to the discussion associated with FIG. 3, we note again the downwardly biased load force applied to read/write head 134 during read/write operations to maintain a predetermined flying height. The load force is generated by a loading effect of suspension 133 and the difference in air pressure resulting from the rotation of disk 110. During the unloading/parking operation, as read/write head 134 moves up and along parking ramp 175 away from disk 110, it is necessary to overcome this load force. To this end, read/write head 134 is lifted to a predetermined vertical height above the surface of disk 110 by inclined surface 161 of parking ramp 175 as a counterpoise to the load force.

Figure 4:
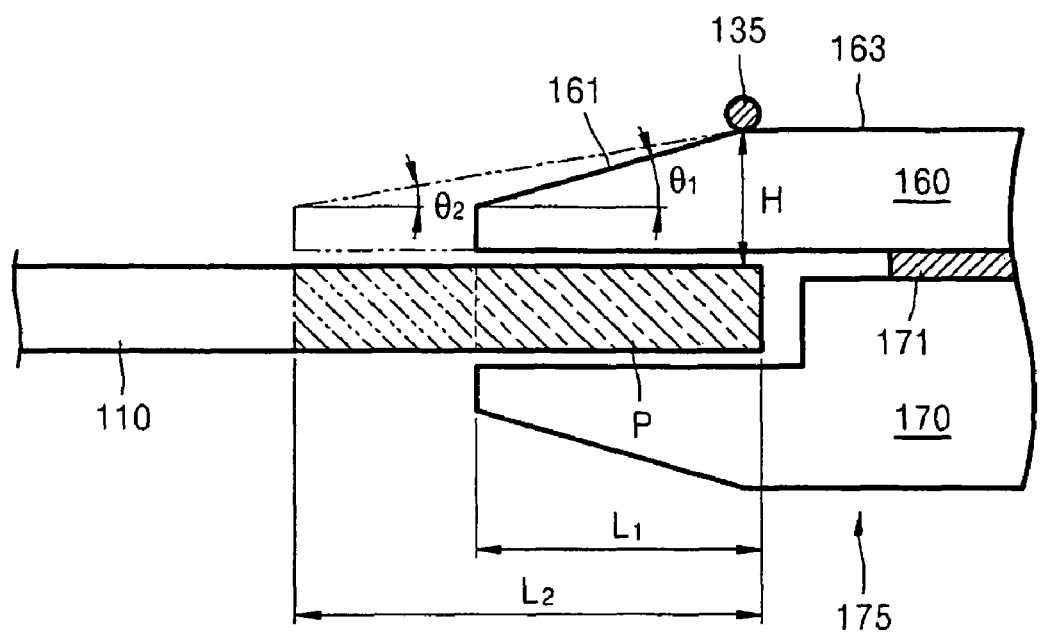
FIG. 4 is a view for explaining the horizontal distance required for different inclination angles to reach a particular vertical height.

Referring now to FIG. 4, inclined surface 161 is assumed to have different inclination angles θ1 and θ2. However, in each example the vertical "lift" height provided to lift tab 135 above disk 110 by inclined surface 161 is assumed to be "H". Thus, the relative horizontal distances L1 and L2 for inclined surface 161 vary with inclination angle and, therefore protrude over disk 110 by differing amounts.

Putting some exemplary numbers to this result to further illustrate this point, a vertical height H required to adequately separate lift tab 135 from disk 110 is assumed to be 0.15 mm. A first horizontal distance L1 of about 0.56 mm results from an inclination angle θ1 of 15°, and a second horizontal distance L2 of about 0.60 mm results from an inclination angle θ2 of 14°.

As also illustrated in FIG. 4, overlap distances, L1 and L2, for inclined surface 161 will also vary with inclination angle. This overlap distance defines a safe zone portion of disk 110, i.e., the outermost circumferential portion of disk 110 underlying guide portion 160. Since the surface of the safe zone cannot be accessed by read/write head 134, unlike the data zone of disk 110, its presence has the effect of reducing the overall data storage capacity of disk 110. Thus, minimizing the overlap distance "L" of guide portion 160 is an attractive design option as it tends to increase recording surface area. Unfortunately, this is at odds with the foregoing motivation to reduce the angle of inclination for the inclined surface of guide portion 160.

As described above with reference to Table 1, to improve the driving margin during an unloading/parking operation given a voice coil motor having a defined (or limited) output power, decreasing the inclination angles θ1 and θ2 of the parking ramp 175 is preferable. In this case, as the horizontal overlap distances L1 and L2 of the inclined surface to reach a particular vertical height H increase, the safe zone formed at the outermost circumferential portion of disk 110 increases.

In embodiments of the invention, since improvement in the driving margin and reduction of safe zone area on disk 110 are simultaneously sought for, a driving device 171 adapted to increase and decrease inclined surface 161 of parking ramp 175 is employed. That is, inclined surface 161 in embodiments of the invention is designed to have a lower angle compared to conventional designs in order to improve the driving margin during the unloading/parking operation. Thus, inclined surface 161 of parking ramp 175 has a reduced inclination angle compared with conventional designs in relation to a given driving margin required to reach a defined vertical height and a corresponding horizontal overlap distance. To this end, by introducing a driving device 171 adapted to adjust the vertical level of inclined surface 161 as necessary, inclined surface 161 may be raised to have a similar vertical height as conventional designs having a much greater inclination angle or a much longer horizontal overlap distance.

Figure 5:
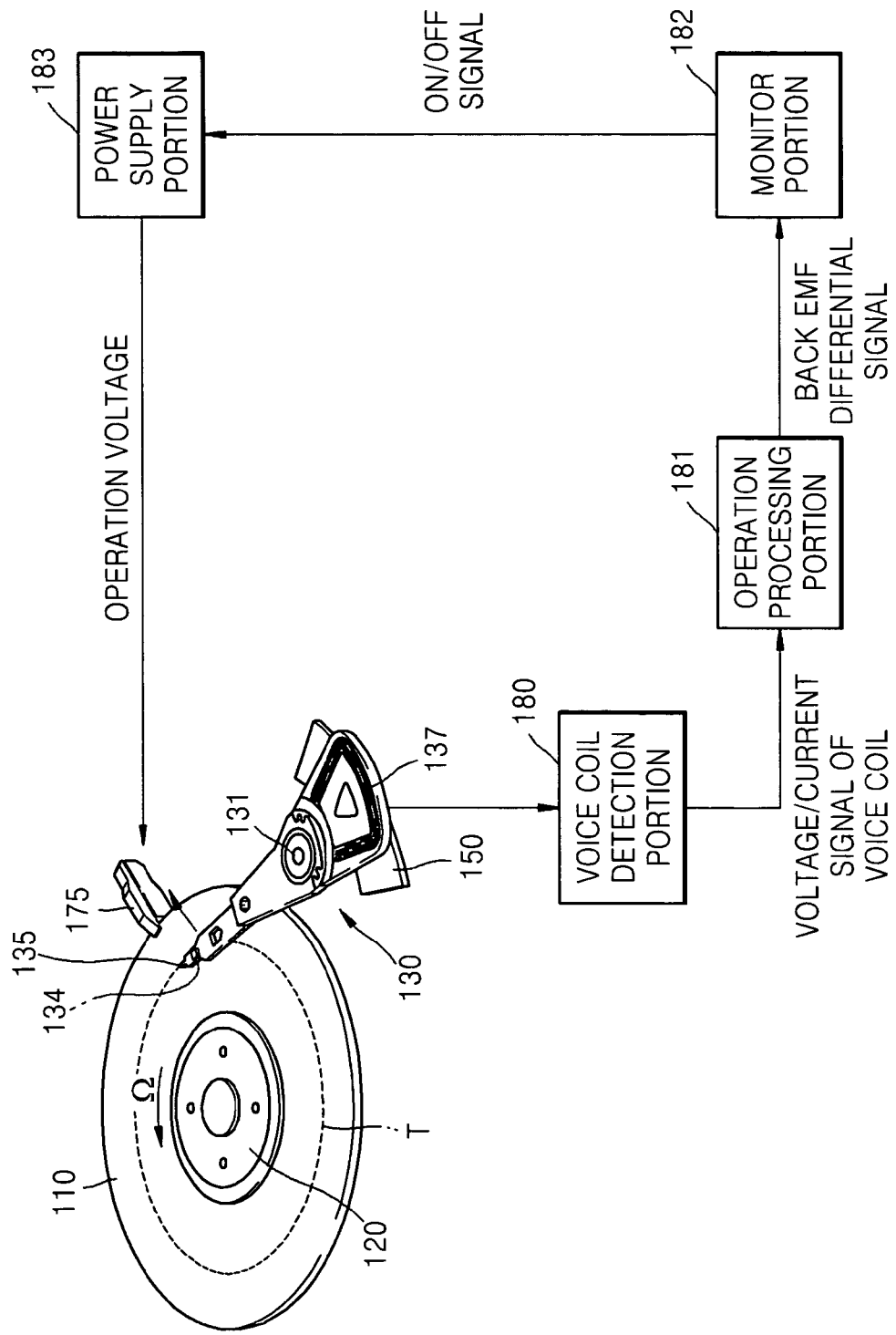
FIG. 5 is a view showing the configuration of a hard disk drive according to an embodiment of the present invention.

FIG. 5 is system schematic view showing an exemplary configuration for an HDD according to an embodiment of the invention. FIG. 6 is a related timing diagram showing internal HDD signals within the system of FIG. 5.

As an unloading/parking operation starts, read/write head 134 is assumed to be performing a read/write operation in relation to a particular disk track T on disk 110 as it is rotated at a constant speed Ω around actuator pivot 131 by the VCM. VCM coil 137 of the VCM is also moved in a magnetic space formed by magnet 150 while rotating around actuator pivot 131 so that a predetermined back EMF (electromotive force) is generated in response to a change in magnetic flux.

The back EMF applied to VCM coil 137 may be calculated by a circuit equation to the VCM coil that is expressed by Equation 1.

$$e(t) = v(t) - L \cdot \left(\frac{di}{dt}\right) - R \cdot i(t) \quad \text{[Equation 1]}$$

Here, v(t) is a voltage detected at both end terminals of the VCM coil, "L" is a reactance constant of the VCM coil, "R" is a resistance of the VCM coil and "i" is current applied to the VCM coil.

The voltage "v" between both end thermals of VCM coil 137 and the current "i" applied to the VCM coil may be measured in real time by a voice coil detection portion 180 connected to coil 137. Information regarding the measured voltage "v" and current "i" may then be communicated to operation processing portion 181. Operation processing portion 181 then provides information about the back EMF of VCM coil 137 in real time by implementing the results of Equation 1, for example, in circuitry.

The graph (a) of FIG. 6 shows an exemplary back EMF signal of VCM coil 137 and a differential signal thereon as a function of time, following initiation of the unloading/parking operation. In the graph (a), the horizontal axis indicates the number of sampling periods during the illustrated time period. In the same graph, the back EMF signal indicates a back EMF signal of VCM coil 137 obtained by operation processing portion 181 and the back EMF differential signal signifies a differential signal obtained from the result of differentiation of the back EMF signal with respect to time. The back EMF signal obtained by this operation is again passed through the differential process performed by operation processing portion 181 and is thereby reprocessed into a back EMF differential signal. The back EMF differential signal generated by operation processing portion 181 is applied to a monitor portion 182 which monitors this signal in real time to derive an ON/OFF switch timing control signal applied to power supply portion 183.

Once the unloading/parking operation starts and VCM coil 137 moves in the magnetic flux space formed by magnet 150 at an almost constant speed during time period "R", the back EMF signal is presented as an AC pulse signal oscillating with a roughly uniform pulse width. Further, during this time period, the back EMF differential signal does not show a great change.

However, when lift tab 135 is lifted from disk 110 onto parking ramp 175 is "bumps" into inclined surface 161. Accordingly, as VCM coil 137 stops moving due to this external collision resistance, a very great back EMF is generated. The back EMF differential signal corresponding to this event is expressed as a transient impulse. As the differential signal is applied to monitor portion 182 in real time, the monitor portion detects this impulse signal, which exceeds a defined critical value, and applies a corresponding ON switching signal to power supply portion 183. (See, graph (b) of FIG. 6). Power supply portion 183 then applies a predetermined operating voltage Vo to driving device 171. (See, graph (c) of FIG. 6). Driving device 171 reacts to the applied operating voltage and vertically expands. Under the influence of expanded driving device 171, inclined surface 161 of parking ramp 175 moves from vertical height h1 to the vertical height h2. (See, graph (d) of FIG. 6).

Accordingly, lift tab 135, as guided upward by inclined surface 161, reaches the apex of inclined surface 161 which is equal to a defined vertical separation requirement between lift tab 135 and disk 110. Lift tab 135, having now escaped the influence of the applied load force, may now be easily moved along the other support surfaces of parking ramp 175 under the influence of the driving torque.

While proceeding along the support surfaces of parking ramp 175, lift tab 135 sequentially passes over horizontal guide surface 163 and capture surface 165, until it reaches parking surface 167, as shown in FIG. 2. After lift tab 135 is parked, and since no more back EMF is induced by VCM coil 137 in a stopped state, the back EMF signal drops to zero. Accordingly, at a time T2 in FIG. 6, when the back EMF signal is no longer detected, or a corresponding convergent signal at a particular offset electric potential is detected, monitor portion 182 determines that lift tab 135 is in a stopped state and outputs an OFF signal to power supply portion 183. (See, graph (b) of FIG. 6). Power supply portion 183 then cuts off the drive voltage applied to driving device 171. (See, graph (c) of FIG. 6). Once driving device 171 no longer receives the driving voltage, it return (e.g., contracts) to its original state and the vertical height of parking ramp 175 falls back from h2 to h1. (See, graph (d) of FIG. 6).

When an actuating material such as SMA or PZT is used to implement driving device 171, a relatively simple driving method and design may be achieved. Such designs facilitate the miniaturization of the HDD without risking failure of the unloading/parking operation, despite use of a low power driving technique, and a parking ramp design with minimal overlap of a safe zone on the disk. However, the scope of the present invention is not limited to only the use of an actuating material. In addition to the use of an actuating material, for example, solenoid structure or similar mechanism might be used to vary the separation distance between guide portion 160 and disk 110.

Figure 7A:
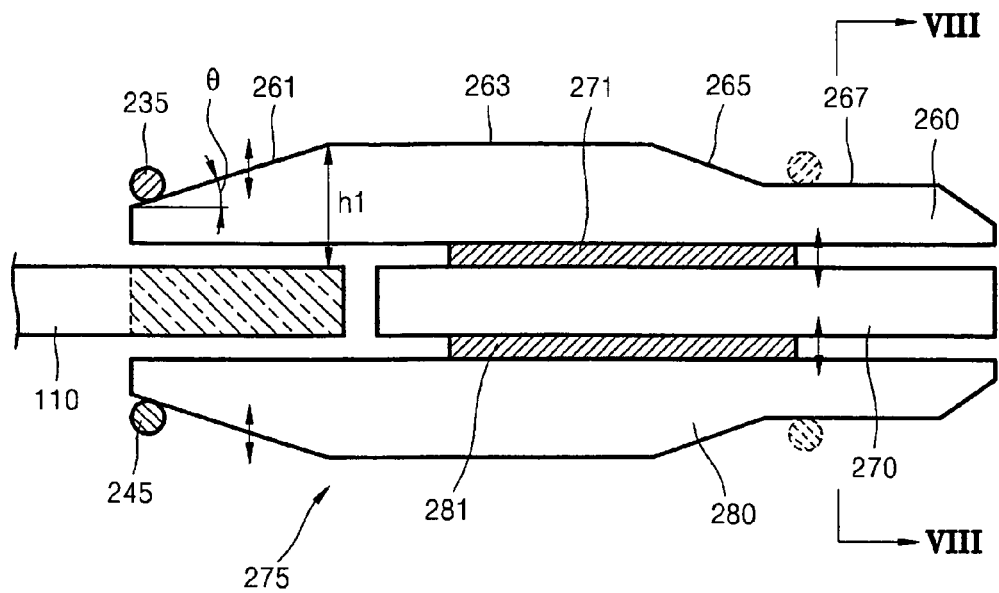
FIGS. 7A and 7B are vertical sectional views of a parking ramp according to another embodiment of the present invention, showing the operation of a driving device.
Figure 7B:
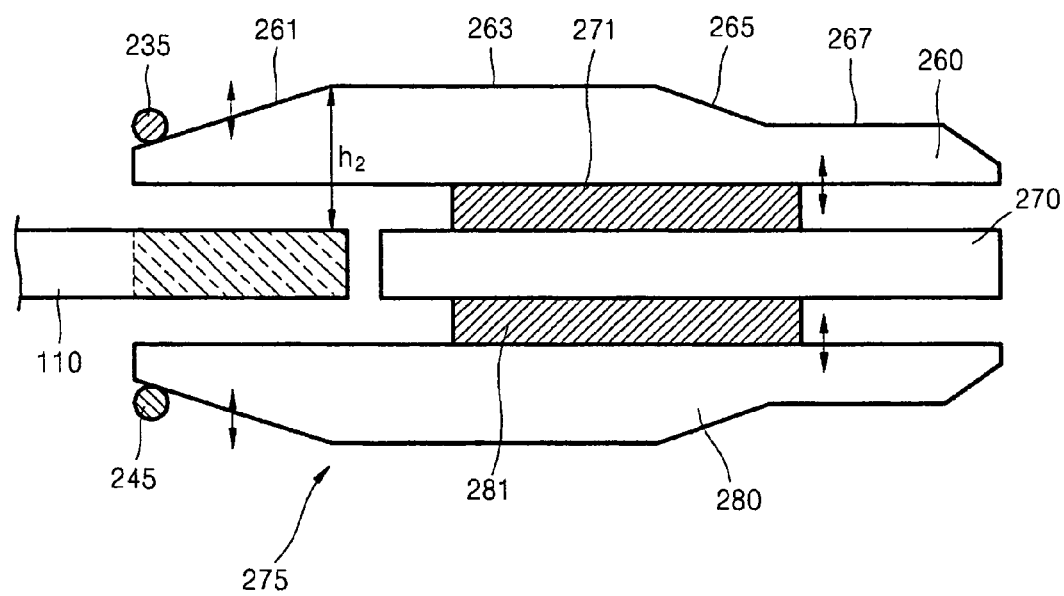

FIGS. 7A and 7B are sectional views of a parking ramp according to another embodiment of the invention. FIG. 7A shows a driving device in a contracted state and FIG. 7B shows the same device in an expanded state.

In FIGS. 7A and 7B, a ramp structure is shown which can be effectively used in a drive apparatus accessing data from both upper and lower surfaces of disk 110. Referring to FIGS. 7A and 7B, a parking ramp 275 includes an installation support portion 270 arranged around the center thereof and first and second guide portions 260 and 280 arranged in the upper and lower sides with respect to the installation support portion 270. Driving devices 271 and 281 are arranged between each of first and second guide portions 260 and 280 and installation support portion 270. The parking ramp 275 illustrated in this embodiment differs from parking ramp 175 of FIG. 2 in that parking ramp 275 has a 3 level structure adapted to receive two driving devices 271 and 281, each employed relative to an upper and lower recording surface of disk 110.

Installation support portion 270 is directly fixed to a frame member and first and second guide portions 260 and 280 may be supported by installation support portion 270. First and second guide portions 260 and 280 are not directly fixed to the frame member so that they may be displaced in a vertical direction by driving devices 271 and 281. Respective first and second guide portions 260 and 280 guide a first lift tab 235 at the upper side and a second lower lift tab 245 at the lower side to support and accommodate them. First guide portion 260 is vertically displaced parallel to installation support portion 270 by the ON/OFF driving of first driving device 271. Similarly, second guide portion 280 is vertically displaced parallel to installation support portion 270 by the ON/OFF driving of second driving device 281. First and second guide portions 260 and 280 may be designed to have shapes symmetrical to each other, each of which may have a plurality of support surfaces including an inclined surface, a horizontal guide surface, a capture surface, and a parking surface.

Although an inclined surface 261 is designed to have an inclination angle θ that is relatively low to improve the driving margin of the VCM during the unloading/parking operation, which is substantially the same as in the above embodiment described with reference to FIG. 2, since twin driving devices 271 and 281 are provided, a sufficient separation distance from disk 110 may be obtained without sacrificing the storage capacity of disk 110. Since detailed descriptions about the other support surfaces are substantially the same as those described with reference to FIG. 2, the descriptions will be omitted herein.

Although first and second driving devices 271 and 281 may be driven independently, in one embodiment first and second driving devices 271 and 281 are simultaneously driven in order to simplify the overall HDD design. Inclined surface 261 provided at each of first and second guide portions 260 and 280 is displaced vertically and parallel to installation support portion 270 according to the expansion or contraction state of first and second driving device 271 and 281 while the vertical distance of inclined surface 261 with respect to the surface of disk 110 changes between h1 and h2. In an HDD incorporating parking ramp 275, since the inclination angle θ of inclined surface 261 acting as an entry barrier is designed to be relatively lower compared to the conventional technology, the driving margin of the VCM may be improved.

In the illustrated embodiment, while the inclination angle θ is designed to be relatively low, the vertical separation distance provided by inclined surface 261 varies from h1 to h2 in accordance with the ON/OFF operation of driving devices 271 and 281. Accordingly, the end portion of the suspension including lift tabs 235 and 245 can be guided to have a vertical distance sufficient to separate from disk 110, although a corresponding horizontal overlap distance will be no greater than conventional HDD designs. The description of driving devices 271 and 281, as well as a competent driving method for each, are substantially the same as those described with reference to FIGS. 5 and 6. That is, the back EMF signal of the voice coil or a differential signal thereof is monitored and a change in the signal is detected so that the ON/OFF switching point of the driving device is obtained and the vertical distance of the ramp inclined surface is varied to h1/h2.

Figure 8:
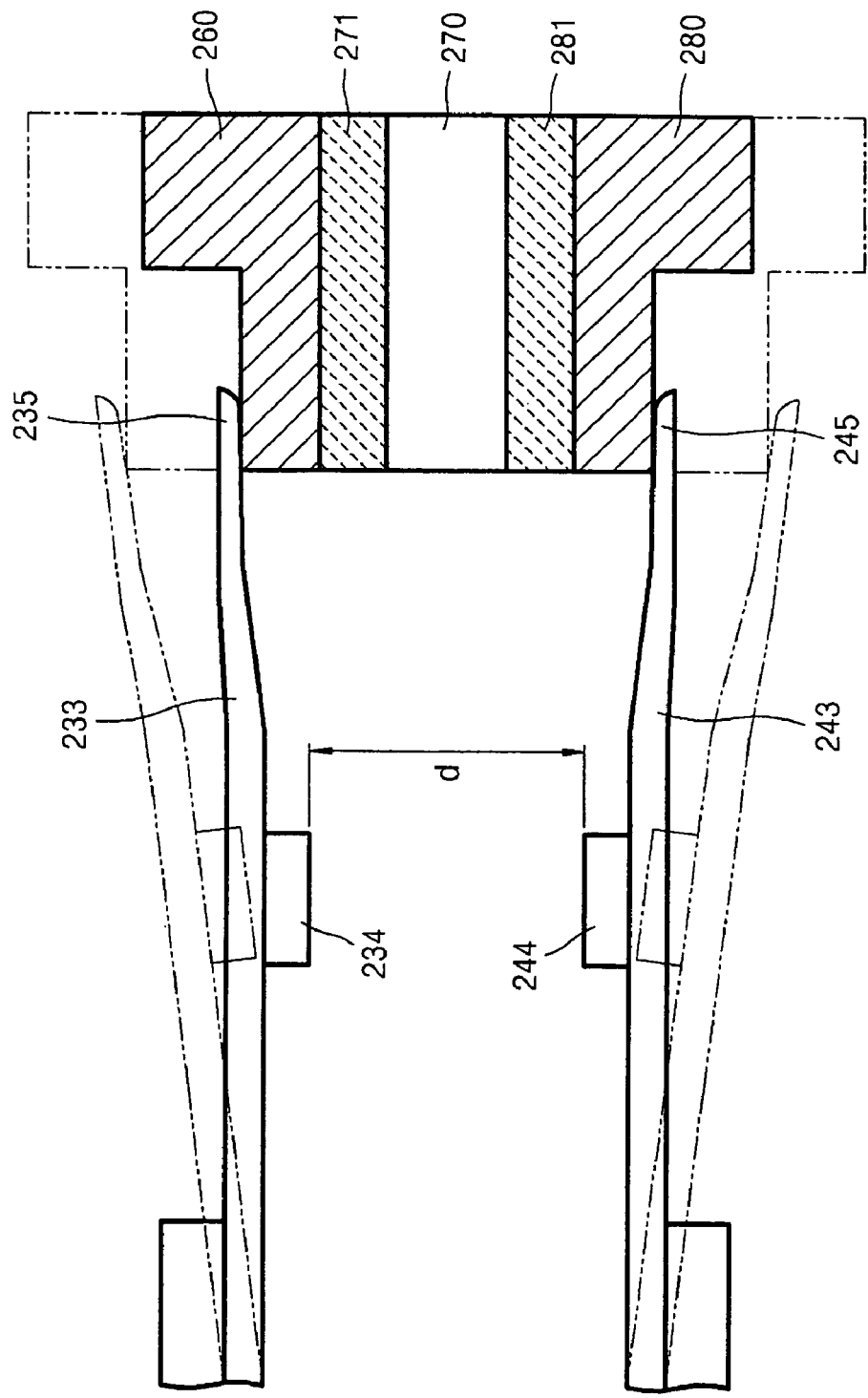
FIG. 8 is a sectional view taken along line VIII-VIII of FIG. 7A.

FIG. 8 is a sectional view taken along line VIII-VIII of FIG. 7A. In FIG. 8, although the structure of suspensions 233 and 243 is schematically illustrated for the convenience of understanding, actually, suspensions 233 and 243 can have a structure including a rod beam and a flexure contacting each other through a dimple provided to secure a particular margin. Referring to FIG. 8, as first and second driving devices 271 and 281 expand or contract, lift tabs 235and 245 supported on first and second guide portions 260 and 280 are vertically displaced. Accordingly, a separation distance "d" between read/write heads 234 and 244 attached to suspensions 233 and 245 varies according to the expansion/contraction state of driving devices 271 and 281.

Although not shown in the drawing, an HDD according to the present invention may include a collision detection sensor adapted to detect an external shock in advance. As an example, the collision detection sensor includes an acceleration sensor to detect a free fall state for the incorporating host device. A predetermined driving voltage can be applied to first and second driving devices 271 and 281 based on an output signal from the acceleration sensor detecting a free fall state. Accordingly, as the separation distance "d" between the read/write heads 234 and 244 increases, collision between read/write heads 234 and 244 and disk 110 may be prevented. That is, if an external shock is applied when read/write heads 234 and 244 are located close to each other, resulting mechanical vibrations fluctuation will be generated due to the elastic nature of suspensions 233 and 243. Left alone under these conditions, read/write heads 234 and 244 may collide against each other and be damaged.

To avoid such ill effects of an external shock, the separation distance "d" between read/write heads 234 and 244 is increased so that the likelihood of damage to read/write heads 234 and 244 due to a collision may be minimized and an anti-shock feature related to the drive apparatus and the reliability of the overall HHD may be improved.

In the accompanying drawings, although a one-dimensional driving device moving in a vertical direction only is illustrated as an example, the technical scope of the present invention is not limited thereto. For example, a driving device capable of two-dimensional movements in vertical and horizontal directions can be provided. The two-dimensional driving device may. have a structure of a combination of a vertical driving device and a horizontal driving device.

As described above, in the parking ramp according to the present invention and a hard disk drive having the parking ramp, since the inclination angle of the parking ramp is lowered, the driving margin can be increased during the unloading. In particular, since the driving margin can be obtained without increasing the output of a voice coil motor, the parking ramp according to the present invention can be more effectively applied to a compact hard disk drive for a mobile use. In the present invention, as the vertical displacement of the inclined surface provided at the parking ramp is changed as necessary, in spite of a low inclined angle, the invalid area of the disk can be minimized.

While this invention has been particularly shown and described with reference to preferred embodiments thereof, it will be understood by those skilled in the art that various changes in form and details may be made therein without departing from the scope of the invention as defined by the appended claims.

What is claimed is:

1. A parking ramp for a hard disk drive (HDD) comprising a VCM coil adapted to move the actuator over a disk within the HDD, the parking ramp comprising:
   a guide portion having an inclined surface adapted to receive a lift tab associated with an actuator mounting a read/write head during an unloading/parking operation, and a parking surface adapted to accommodation the lift tab at the completion of the unloading/parking operation;
   an installation support portion fixed in the HDD and adapted to support the guide portion;
   a vertically adjustable driving device provided between the guide portion and the installation support portion and adapted to position the guide portion at a first vertical height relative to the installation support and a second vertical height greater than the first vertical height, wherein the driving device vertically expands from an original state when an operating voltage is applied and vertically contracts back to the original state when the operating voltage is no longer applied; and
   a voice coil detection portion connected to the VCM coil and adapted to detect a voltage or current associated with a back EMF of the VCM coil.

2. The parking ramp of claim 1, wherein the driving device is made of a shape memory alloy (SMA) actuating material or a PZT actuating material.

3. The parking ramp of claim 1, further comprising:
   an operation processing portion adapted to generate a back EMF differential signal on the basis of the voltage or current detected by the voice coil detection portion; and
   a monitoring portion monitoring the back EMF signal in real time and providing an ON/OFF control signal to a power supply portion selectively supplying the operating voltage to the driving device.

4. The parking ramp of claim 1, wherein the driving device is responsive to an ON state operating voltage and an OFF state operating voltage, such that the ON state operating voltage causes the guide portion to be positioned at the second height and the OFF state operating voltage causes the guide portion to be positioned at the first height.

5. The parking ramp of claim 4, wherein the OFF state operating voltage is applied to the driving device upon termination of the unloading/parking operation.

6. The parking ramp of claim 4, wherein the ON state operating voltage is applied to the driving device as the lift tab moves over the inclined surface.

7. The parking ramp of claim 6, wherein the ON state operating voltage is applied to the driving device as the lift tab moves proximate to an apex of the inclined surface.

8. A hard disk drive (HDD), comprising:
   a disk having upper and lower recording surfaces;
   at least one actuator supporting first and second read/write heads adapted to move respectively over the upper and lower recording surfaces and comprising first and second lift tabs;
   at least one VCM coil adapted to move the at least one actuator over the disk; and
   a parking ramp comprising:
      first and second guide portions, each having an inclined surface adapted to receive respectively the first and second lift tabs during an unloading/parking operation, wherein the first and second driving devices vertically expand from an original state when an operating voltage is applied and vertically contract back to the original state when the operating voltage is no longer applied;
      an installation support portion fixed in the HDD and adapted to support the first and second guide portions;
      a vertically adjustable first driving device provided between the first guide portion and the installation support portion and adapted to position the first guide portion at a first vertical height relative to the installation support and a second vertical height greater than the first vertical height;
      a vertically adjustable second driving device provided between the second guide portion and the installation support portion and adapted to position the second guide portion at a third vertical height relative to the installation support and a fourth vertical height greater than the third vertical height: and
      a voice coil detection portion connected to the at least one VCM coil and adapted to detect a voltage or current associated with a back EMF of the at least one VCM coil.

9. The HDD of claim 8, wherein the first and second driving devices are made of a shape memory alloy (SMA) actuating material or a PZT actuating material.

10. The HDD of claim 8, further comprising:
    an operation processing portion adapted to generate a back EMF differential signal on the basis of the voltage or current detected by the voice coil detection portion; and
    a monitoring portion monitoring the back EMF signal in real time and providing an ON/OFF control signal to a power supply portion selectively supplying the operating voltage to at least one of the first and second driving devices.

11. The HDD of claim 8, wherein the first driving device is responsive to a first ON state operating voltage, such that upon application of the first ON state operating voltage to the first driving device, the first guide portion is positioned at the second height, and the first driving device is further responsive to a first OFF state operating voltage, such that upon application of the first OFF state operating voltage to the first driving device, the first guide portion is positioned at the first height; and wherein the second driving device is responsive to a second ON state operating voltage, such that upon application of second ON state operating voltage to the second driving device, the second guide portion is positioned at the fourth height, and the second driving device is further responsive to a second OFF state second operating voltage, such that upon application of the second OFF state operating voltage to the second driving device, the second guide portion is positioned at the third height.

12. The HDD of claim 11, where the first and second ON state operating voltages are the same commonly supplied voltage, and the first and second OFF state operating voltages are the same commonly supplied voltage.

13. The HDD of claim 11, wherein each of the first and second OFF state operating voltages is respectively applied to the first driving device and the second driving device upon termination of the unloading/parking operation.

14. The HDD of claim 11, wherein the first ON state operating voltage is applied to the first driving device as the first lift tab moves over the first inclined surface, and the second ON state operating voltage is applied to the second driving device as the second lift tab moves over the second inclined surface.

15. The HDD of claim 14, wherein the first ON state operating voltage is applied to the first driving device as the first lift tab moves proximate to an apex of the first inclined surface, and the second ON state operating voltage is applied to the second driving device as the second lift tab moves proximate to an apex of the second inclined surface.

* * * * *